J. A. GRANDY.
VEHICLE SPRING.
APPLICATION FILED SEPT. 19, 1907.
920,321.
Patented May 4, 1909.
2 SHEETS—SHEET 2.
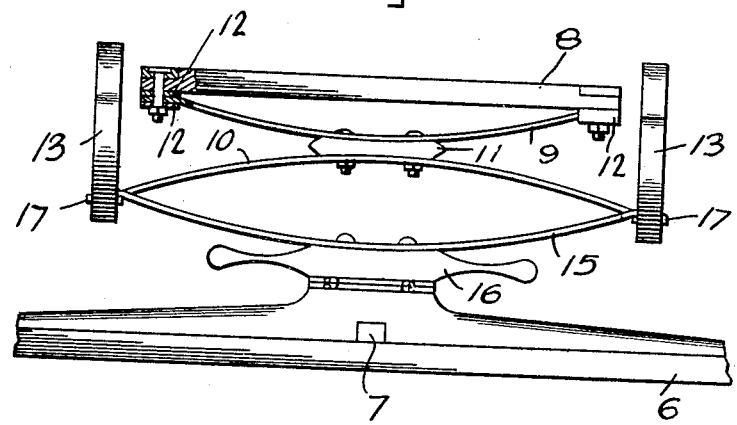
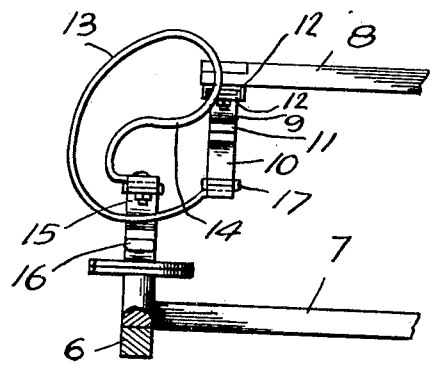
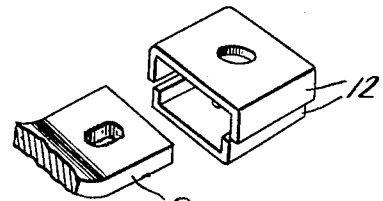
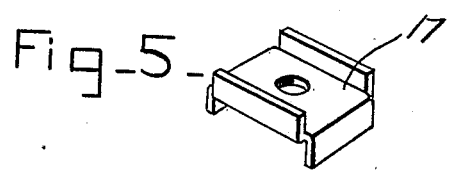
Witnesses
M. J. Rockwell
M. J. Miller
Inventor
Joseph A. Grandy
By
Attorneys

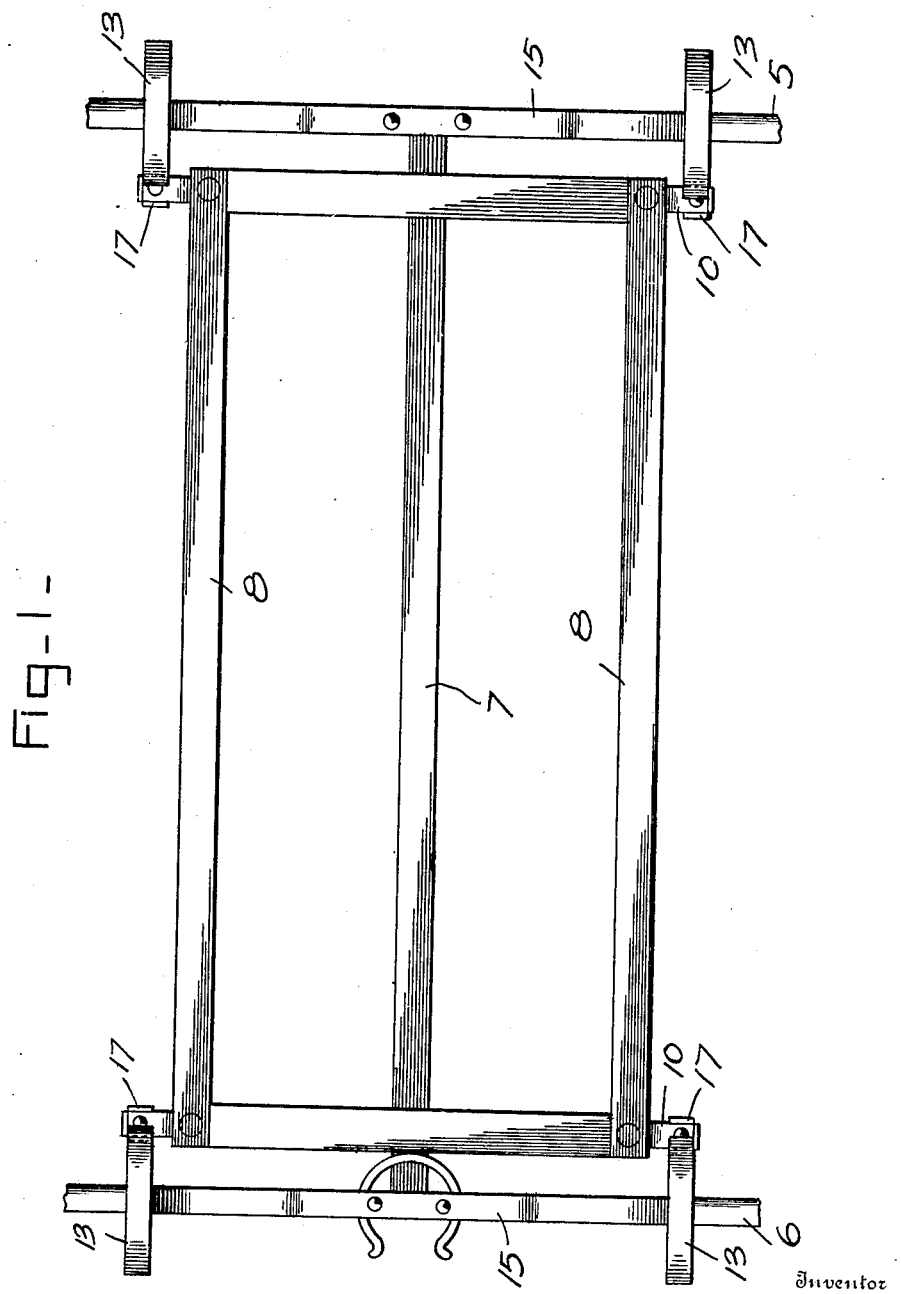

UNITED STATES PATENT OFFICE.

JOSEPH A. GRANDY, OF McCLURE, MICHIGAN.

VEHICLE-SPRING.

No. 920,321.     Specification of Letters Patent.     Patented May 4, 1909.

Application filed September 19, 1907. Serial No. 393,705.

*To all whom it may concern:*

Be it known that I, JOSEPH A. GRANDY, a citizen of the United States, residing at McClure, in the county of Gladwin, State of Michigan, have invented certain new and useful Improvements in Vehicle-Springs; and I do hereby declare the following to be a full, clear, and exact description of the invention, such as will enable others skilled in the art to which it appertains to make and use the same.

The present invention has reference to vehicle springs and it aims to overcome the jarring incident to sudden starts and stops and to rough and uneven roads by the provision of a set of composite springs, which, when adjusted to a vehicle, will impart to the vehicle body a slight longitudinal motion in addition to the ordinary vertical motion.

To this end the invention consists in the provision of a series of inwardly-directed spiral springs, whose opposite ends are fastened to the adjacent ends of the ordinary bowed springs which are bolted centrally to the front and rear axles and adjacent cross-pieces of the bed of the vehicle, so that the spiral springs and bowed springs mutually relieve each other.

The invention will be readily understood from a consideration of the following detailed description, and its preferred embodiment is illustrated in the accompanying drawings, in which like parts are designated by corresponding reference numerals throughout the several views.

Of the said drawings, Figure 1 is a plan view of the running gear of a vehicle equipped with the improved set of springs, Fig. 2 is a front elevation thereof, Fig. 3 is a fragmental side elevation of one of the spiral springs and its attendant connections Fig. 4 is an enlarged perspective view of one of the double castings, the parts thereof being shown as separate from each other. Fig. 5 is an enlarged perspective view of one of the single castings.

Referring more particularly to the drawings 5 and 6 designate the front and rear axles, connected by the reach 7, and 8, the bed of the vehicle, the front and rear cross-pieces of the bed being each provided with a pair of oppositely-bowed transverse springs, the upper member 9 of each pair of springs being fastened centrally to the lower spring 10, and at opposite ends to the corresponding cross-piece, a mat block 11 being interposed between the springs 9 and 10, as shown. Each end of the upper springs 9 is fastened to the adjacent end of the corresponding cross-piece of the bed by means of a double casting 12 comprising an upper and a lower U-shaped member between which the spring-end fits, said members being so arranged with respect to each other that the upstanding arms of the lower member fit against the side edges of the spring, while the depending arms of the upper member fit against the outer faces of the first-mentioned arms. The members of each casting are provided with alining bolt holes which register with the slotted ends of the corresponding spring 9, which are therefore, capable of a slight movement toward and from each other.

The lower springs 10 have a length sufficient to project at opposite ends beyond the sides of the bed, as shown, each end of said springs being connected to the outer end of a spiral spring 13 disposed longitudinally of the vehicle and provided intermediate its ends with an inwardly-directed portion 14 whose extremity is secured to a downwardly-bowed transverse spring 15 secured centrally by means of bolts to the corresponding axle, the front axle being provided with the usual head block 16 to which the spring is fastened. The mats 11 are likewise secured to the springs 9 and 10 by similar bolts. The connection between the ends of the springs 10 and the outer ends of the corresponding spiral springs is effected by single castings 17, each of which has its side edges bent downwardly against the side edges of the adjacent spiral springs, while its front and rear edges are bent upwardly against the ends of the springs 10.

From the foregoing description it will be understood that in as much as the spiral springs are connected both to the axle and bed supporting springs, the several springs will mutually relieve each other, and it will be likewise apparent that the wagon bed will be capable of a slight longitudinal movement in addition to the ordinary vertical motion.

What is claimed, is,

The combination, with the bed and axles of a vehicle, of a downwardly-bowed spring secured at its ends to each end piece of the bed, an upwardly-bowed spring secured centrally to each of the first-mentioned springs, a downwardly-bowed spring secured centrally to each axle and located in a vertical plane parallel with and in spaced relation to that of the adjacent upwardly-bowed spring, and separate spiral springs arranged to connect the mutually-adjacent ends of the upwardly-bowed springs and the axle springs together, each spiral spring having one end fastened to the adjacent end of one of the axle springs, and the other end thereof fastened to that of the adjacent upwardly-bowed spring, whereby the several springs mutually relieve each other, the spiral spring at each end of the bed being disposed parallel with each other and at right angles to the adjacent upwardly-bowed and axle springs.

In testimony whereof, I affix my signature, in presence of two witnesses.

JOSEPH A. GRANDY.

Witnesses:
 JOHN HUTSON,
 C. G. GOODMAN.